(12) United States Patent
Tuffs

(10) Patent No.: US 11,657,098 B1
(45) Date of Patent: May 23, 2023

(54) FEEDBACK FILTERING OF TIME-SERIES METRIC DATA

(71) Applicant: Palo Alto Networks, Inc., Santa Clara, CA (US)

(72) Inventor: Philip Simon Tuffs, Pacific Grove, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/453,745

(22) Filed: Nov. 5, 2021

(51) Int. Cl.
*G06F 16/00* (2019.01)
*G06F 16/9035* (2019.01)

(52) U.S. Cl.
CPC .................................. *G06F 16/9035* (2019.01)

(58) Field of Classification Search
CPC .................................................. G06F 16/9035
See application file for complete search history.

(56) References Cited

U.S. PATENT DOCUMENTS

2020/0167349 A1* 5/2020 Marquardt .......... G06F 16/2228

OTHER PUBLICATIONS

Hachenbaum, et al., "Automatic Anomaly Detection in the Cloud Via Statistical Learning", ArXiv, vol. abs/1704.07706, Apr. 2017, 13 pages.
Maleki, et al., "Unsupervised anomaly detection with LSTM autoencoders using statistical data-filtering", Elsevier, Applied Soft Computing, vol. 108, Sep. 2021, 10 pages.

* cited by examiner

*Primary Examiner* — Ajith Jacob
(74) *Attorney, Agent, or Firm* — Gilliam IP PLLC

(57) ABSTRACT

A cloud monitoring system is disclosed herein that uses a filtering paradigm after metric data aggregation and before storing in a repository that allows querying the metric data to significantly reduce the raw data stored into the repository. A persistence filter identifies extremal cloud metrics that are persistent across time windows, increasing the confidence that extremal metrics correspond to abnormal behavior. A cloud metric filter comprising a sequence of logical and statistical filters that are interchangeable in order and use allows for dynamic filtering of cloud data. The cloud metric filter has a feedback control loop to update the order and parameters of individual filters based on properties of filtered metric values. Intelligent filtering of cloud metric data yields a focused set of statistically significant metric data for monitoring and eliminates noisy metric data for normal behavior.

20 Claims, 8 Drawing Sheets

_US 11,657,098 B1_

FEEDBACK FILTERING OF TIME-SERIES METRIC DATA

BACKGROUND

The disclosure generally relates to the field of information processing, and to operations, monitoring and observability.

Cloud service providers allow customers to generate a wide variety and volume of data related to performance of devices and applications running on those devices across a cloud. This data can be published to monitoring/observability systems which are used to analyze the operational state of those systems. Customers choose one or more monitoring/observability systems to store and analyze data in real-time.

BRIEF DESCRIPTION OF THE DRAWINGS

Embodiments of the disclosure may be better understood by referencing the accompanying drawings.

DESCRIPTION

Figure 1:
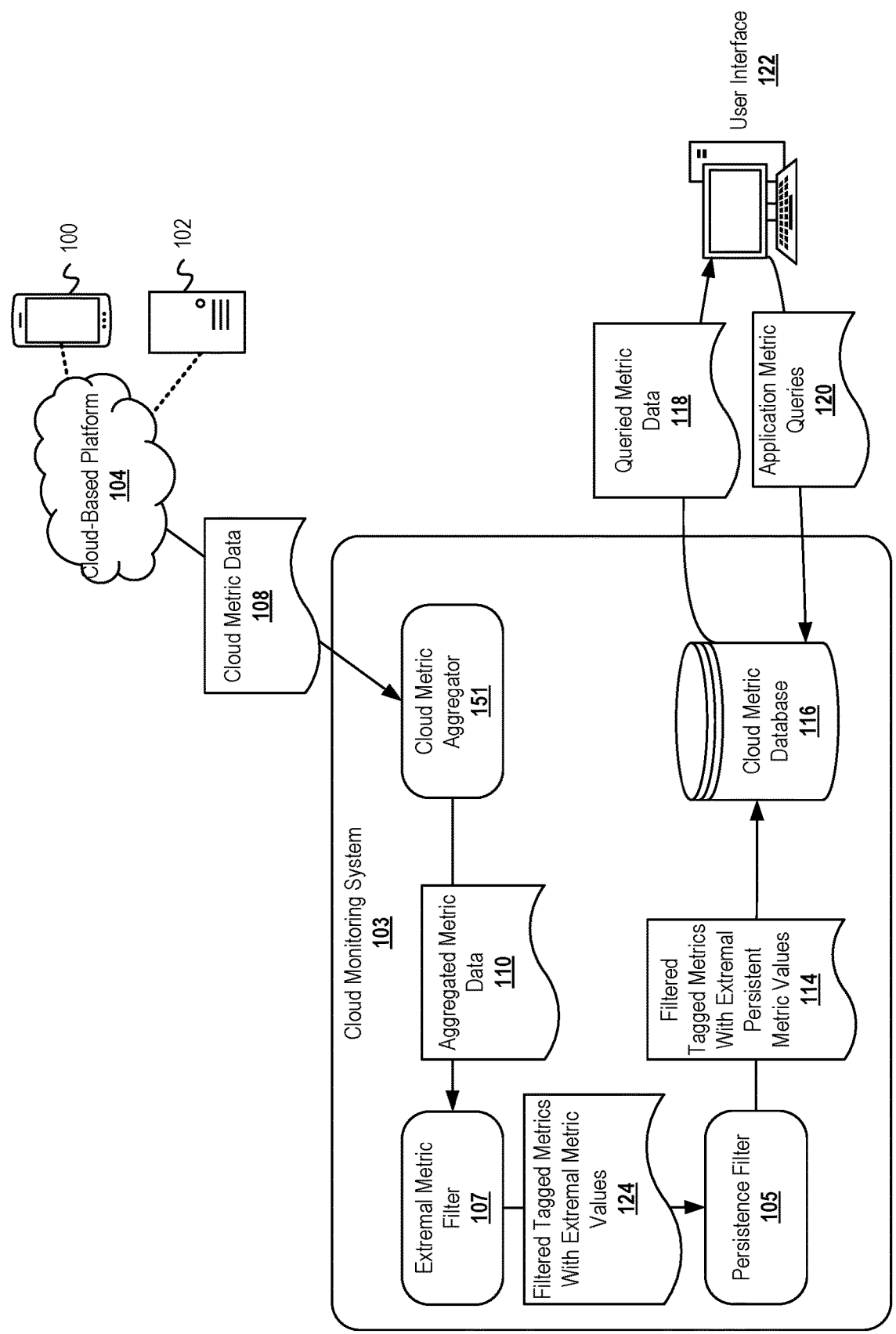
FIG. 1 is a schematic diagram of a cloud monitoring system for filtering extremal persistent metric values from metric values aggregated from a cloud.

The description that follows includes example systems, methods, techniques, and program flows that embody aspects of the disclosure. However, it is understood that this disclosure may be practiced without these specific details. For instance, this disclosure refers to filtering metric values from aggregated cloud data with a feedback control loop of filters in illustrative examples. Aspects of this disclosure can be also applied to metric data for monitoring metrics for Internet of Things devices or any other type of time series metrics. In other instances, well-known instruction instances, protocols, structures and techniques have not been shown in detail in order not to obfuscate the description.

Overview

The sheer volume of metric data generated by applications in a cloud renders analysis and storage of all available metric values for detection of outlier behavior intractable. To reduce volume by many orders of magnitude, monitoring and observability systems track extremal top and bottom metric values within time windows while discarding non-extremal metric values because extremal metric values such as minimum and maximum compute times can indicate abnormal behavior. However, when exhibiting normal behavior, metric values can appear to be extremal metric values. A cloud monitoring system is disclosed herein that uses a filtering paradigm after basic metric data statistical aggregation and before storing in a repository, that reduces the data storage volume by many orders of magnitude. This preserves observation of the universe of metrics provided to a monitoring system without burdening the repository and degrading performance with raw data that would not be of interest. The cloud monitoring system identifies metric data with abnormal metric values using stateless and stateful time-series filters that can include one or more of a persistence/coherence filter and a cloud metric filter. A persistence/coherence filter identifies extremal cloud metrics that are persistent/coherent across time windows, increasing the confidence that extremal metrics correspond to abnormal behavior. A cloud metric filter comprises a collection of logical and statistical filters that are composable for dynamic filtering of cloud data. The cloud metric filter has a stateful feedback measurement loop to update the parameters of individual filters based on properties of filtered metric values. Intelligent filtering of cloud metric data yields a focused set of statistically significant metric data for monitoring and eliminates noisy metric data for normal behavior.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The term "metric" used herein is synonymous with "cloud metric" and refers to a type of measurement or measured property (e.g., a statistic computed from measurements) obtained from a device by a cloud-based platform or application. A metric can be represented with a "tuple": (metric-name, metric-value, tag1,tag2, . . . tagN). "Metric value" refers to a value of a metric which is numerical (e.g., 0.55 is the value for the metric CPU utilization). In addition, metrics are named: the name of the metric in that same example would be "CPU utilization". Metric values can be expressed or associated with metadata such as time stamps and a label indicating the corresponding metric (e.g., 1337 CPU utilization, 2:03 am, 54%). Metric values have associated tags that indicate scope for the metric value in the cloud. Metric values can have multiple tags that indicate multiple scopes. For instance, a metric tracking response time across an organization of a device can be associated with both a tag for the organization and a tag for a user device in the organization. Scopes can be hierarchical and allow tracking of metrics at different granularities depending on a desired level of analysis. A "tagged metric" or "metric vector" refers to a structure (e.g., multidimensional vector) that at least indicates a metric value and an associated tag value. Since a tag is a pairing {tag-key, tag-value}, tagging a metric refers to associating n tags or just the tag value(s) with a metric value. The tagged metric can also indicate the metric name (e.g., as a tag) and metadata (e.g., timestamp). "Filtered metric values" refers to metric values that remain after applying a filter to metric values (e.g., the filter removes unwanted metric values), and "filtered tagged metrics" refers to metric tags remaining after a filter is applied to either the tagged metrics or metric values.

A "time window" refers throughout to one or more intervals of time used for monitoring of systems that produce metric values with corresponding time stamps. Metric values are monitored and/or aggregated at the end of each time window. Time windows are fixed size with respect to a set of metrics, in order to achieve "stationary" statistics that can be combined and analyzed. Different subsystems can be aggregated with different time windows, but the size of the time windows remains fixed over time.

Example Illustrations

FIG. 1 is a schematic diagram of a cloud monitoring system for filtering extremal persistent metric values from metric values aggregated from a cloud. In FIG. 1, a cloud monitoring system 103 obtains cloud metric data 108 from devices including devices 100, 102 via a cloud-based platform 104. The devices 100, 102 and/or a system (e.g., software-as-a-service (SaaS) system) "push" the cloud metric data 108 to the cloud monitoring system 103. This can be according to a publisher-subscriber paradigm, for example. Since the sources of the cloud metric data 108 are diverse and push data asynchronously, a cloud metric aggregator 151 of the cloud monitoring system 103 aggregates the obtained cloud metric data 108.

The cloud metric aggregator 151 aggregates tagged metrics in the cloud metric data 108 based on indicated metric values. The cloud metric aggregator 151 may add additional data and/or tags to the tagged metrics of the cloud metric data 108. Aggregation of tagged metrics yields aggregated metric data 110. An extremal metric filter 107 receives the aggregated metric data 110 and filters out tagged metrics with non-extremal metric values to yield filtered tagged metrics 124 with extremal metric values. A persistence/coherence filter 105 receives the filtered tagged metrics with extremal metric values 124 and further filters to generate filtered tagged metrics 114 with extremal persistent metric values. A cloud metric database 116 stores the tagged metrics with extremal persistent metric values 114 which are later communicated for presentation/display via a user interface 122 as queried metric data 118 in response to cloud metric queries 120 via the user interface 122.

Metrics for metric values aggregated from the cloud metric data 108 comprise metrics for application and device performance, device health, statistics of processes running on devices, etc. For instance, cloud metrics can include central processing unit (CPU) utilization, memory utilization, compute times for processes, number of running processes, request rates, chip health, queue time, response time, user satisfaction, number of cloud errors, etc. Extremal behavior for these metrics including both large and small metric values can be a strong indicator of outlier device behavior. For instance, long compute times may indicate that a process for a device is not running efficiently or is "buggy," whereas short compute times may indicate that the process is skipping computational steps possibly due to an error. A high number of processes may indicate that an application is spawning too many processes or not terminating existing processes correctly, whereas a low number of processes may indicate that a SaaS is not spawning necessary processes. A repository can have a groupby functionality that allows for tag based searching of stored and aggregated metric data, for instance, according to different scopes (e.g., customer, account, user, organization) indicated by tags. This allows for tracking of cloud metrics specific to a desired scope of analysis.

The cloud metric aggregator 151 comprises an index of cloud metrics and is configured to identify metrics in the cloud metric data 108 and to compute metric values for metrics in the index of cloud metrics as data are received. The cloud metric aggregator 151 groups the cloud metric data 108 by tags as prescribed by the cloud monitoring system 103 across time windows. The cloud monitoring system 103 can specify customers, organizations, etc. of interest for monitoring by tags. The cloud metric aggregator 151 can aggregate a set of the cloud metric data 108 into multiple metric values. For instance, the cloud metric aggregator 151 can determine that some of the cloud metric data 108 are CPU utilization based on a label in the cloud metric data 108 and can aggregate CPU utilization data for a customer and for an organization that the customer belongs to. The cloud metric aggregator 151 can average or otherwise compute statistics (such as min/mean/max/standard-deviation) for metric values across time windows. For instance, the cloud metric aggregator 151 can average CPU utilization over 15-minute periods. The granularity of the time windows can depend on available computing resources to filter and store metric values and the desired level of outlier detection. For some metrics that are known to have low variability over short time windows, the cloud metric aggregator 151 can extend the time windows. For instance, chip health does not often vary between healthy and damaged within short periods of time so the cloud metric aggregator 151 can extend the time windows for this metric (e.g., to a day). The cloud metric aggregator 151 can receive and aggregate the cloud metric data 108 as sets of data as they are received.

The extremal metric filter 107 uses statistics of the aggregated metric data 110 to filter out non-extremal metric values and generate the filtered tagged metrics with extremal metric values 124. To exemplify, the extremal metric filter 107 can calculate and store the mean and standard deviation for each cloud metric based on the tag-values of the tags of that tagged metric. The extremal metric filter 107 can then filter out all but the top N and bottom N metric values corresponding to tag-values that are the most standard deviations above or below the respective means. N is a hyperparameter that can be specified by a user (e.g., via user interface 122) and can depend on the amount of storage space in the cloud metric database 116 and the amount of computing resources available to execute the persistence filter 105. The number of top and bottom metric values can be distinct (e.g., top 10 and bottom 5 metric values).

The persistence filter 105 tracks persistence of metric values in the extremal metric values 124 across time windows specific to the scope of each tag. A persistence filter presumes persistence as an indication of statistical coherence. The system treats values filtered out by a persistence filter as noise. The use of persistence to track metric values can vary by implementation. For the purposes of illustration in the present disclosure, persistence means that metric values for a cloud metric occur across a threshold number of consecutive time windows in the filtered tagged metrics with extremal metric values 124. For instance, values for compute times can occur in three consecutive time windows at 3:00 pm, 3:15 pm, and 3:30 pm in the filtered tagged metrics with extremal metric values 124. Based on using two for the threshold number of consecutive values, the persistence filter 105 determines that compute times are persistent over these time windows and adds the corresponding metric values to the extremal persistent metric values. The threshold number of consecutive values can be hard coded in the cloud monitoring system 103 or can be provided by a user via the user interface 122. This threshold can vary based on the cloud metric being analyzed for persistence. In some embodiments, the metric values for a cloud metric do not need to be consecutive in the extremal metric values 124. For instance, the persistence filter 105 can determine that the proportion of metric values for a cloud metric over a specified number of time windows is above a threshold proportion (e.g., nine out of the last ten time windows). Other running statistics for metric values that extend beyond a set number of time windows can be used. Using a persistence/coherence filter reduces the exponential dimension vector space of tagged metrics down to a constant dimension vector space of the most significant metrics.

While FIG. 1 depicts the cloud metric aggregator 151 as co-located with other components of the cloud monitoring system 103, embodiments are not so limited. The aggregating functionality of the cloud monitoring system 103 can be implemented with a distributed architecture or a hierarchical-distributed architecture. Agents can be deployed to devices to receive the metric data of the hosting device and aggregate at the device. Agents can be deployed to an edge computing system that obtains metric data from devices associated with the edge computing system. As another example, agents that implement the aggregating functionality can be deployed in a hierarchy and configuration leverage the hierarchy. For instance, aggregating agents that are a first communication point for receiving metric data from devices to aggregate tagged metrics at a fine granularity with agents higher in the hierarchy running at a coarser granularity of time.

The use of the cloud-based platform 104 is for illustration of the intractable amount of data generated for clouds running across hundreds or thousands of devices. Even more intractable use cases of the cloud monitoring system 103 such as Internet of Things devices are also anticipated by the present disclosure.

FIG. 1 depicts a cloud monitoring system with an integrated pipeline comprising an extremal metric filter and a persistence filter. The cloud monitoring system depicted in FIG. 1 is an example illustration for an embodiment(s) of filtering for metric values collected in a cloud. Other embodiments can use a feedback system. Embodiments can use a feedback system to dynamically determine the order and occurrence of multiple types of filters in a cloud monitoring system including but not limited to the extremal metric filter and persistence filter in FIG. 1.

Figure 2:
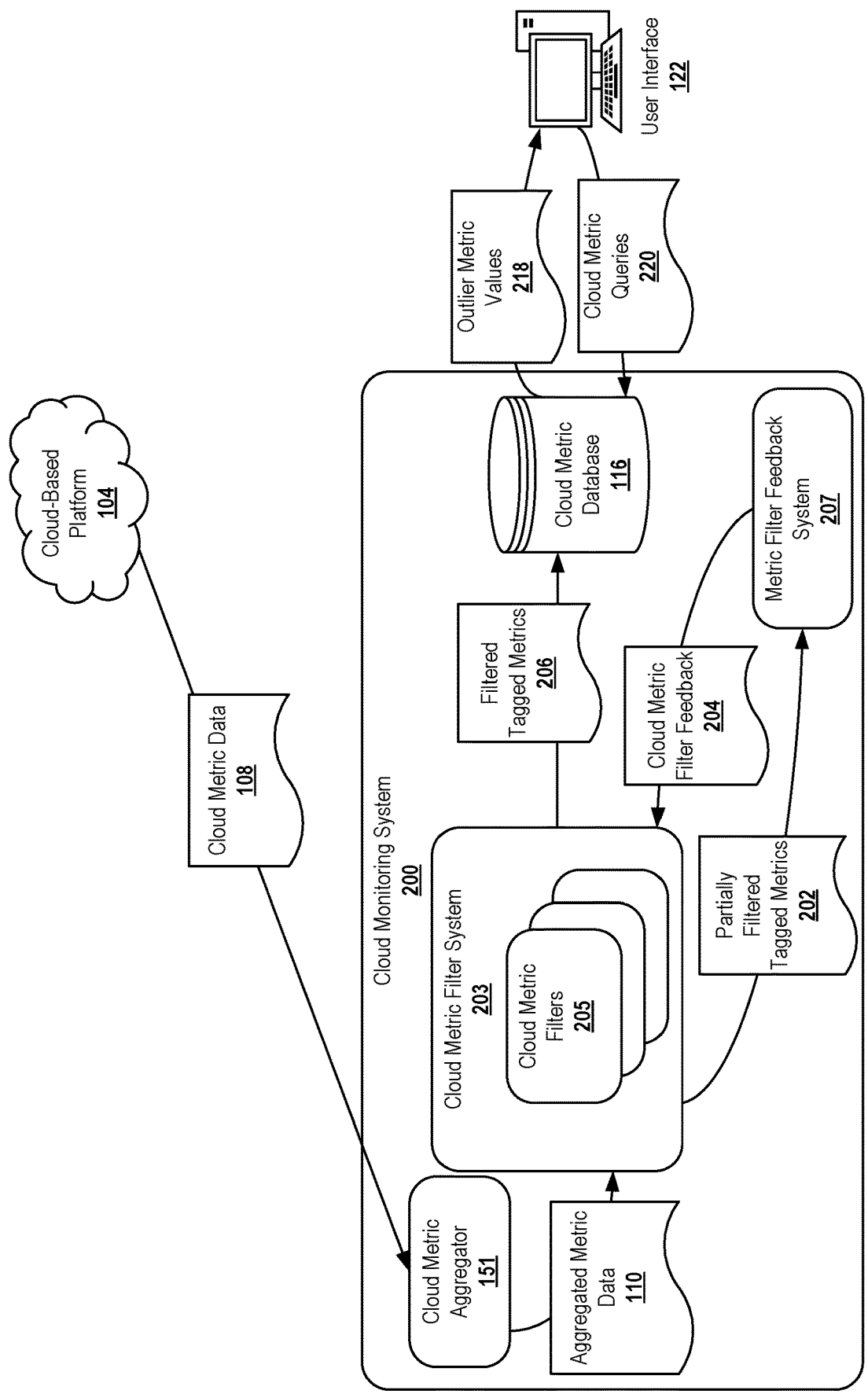
FIG. 2 is a schematic diagram of a cloud monitoring system for filtering metric values with a cloud metric filter feedback loop.
Figure 3:
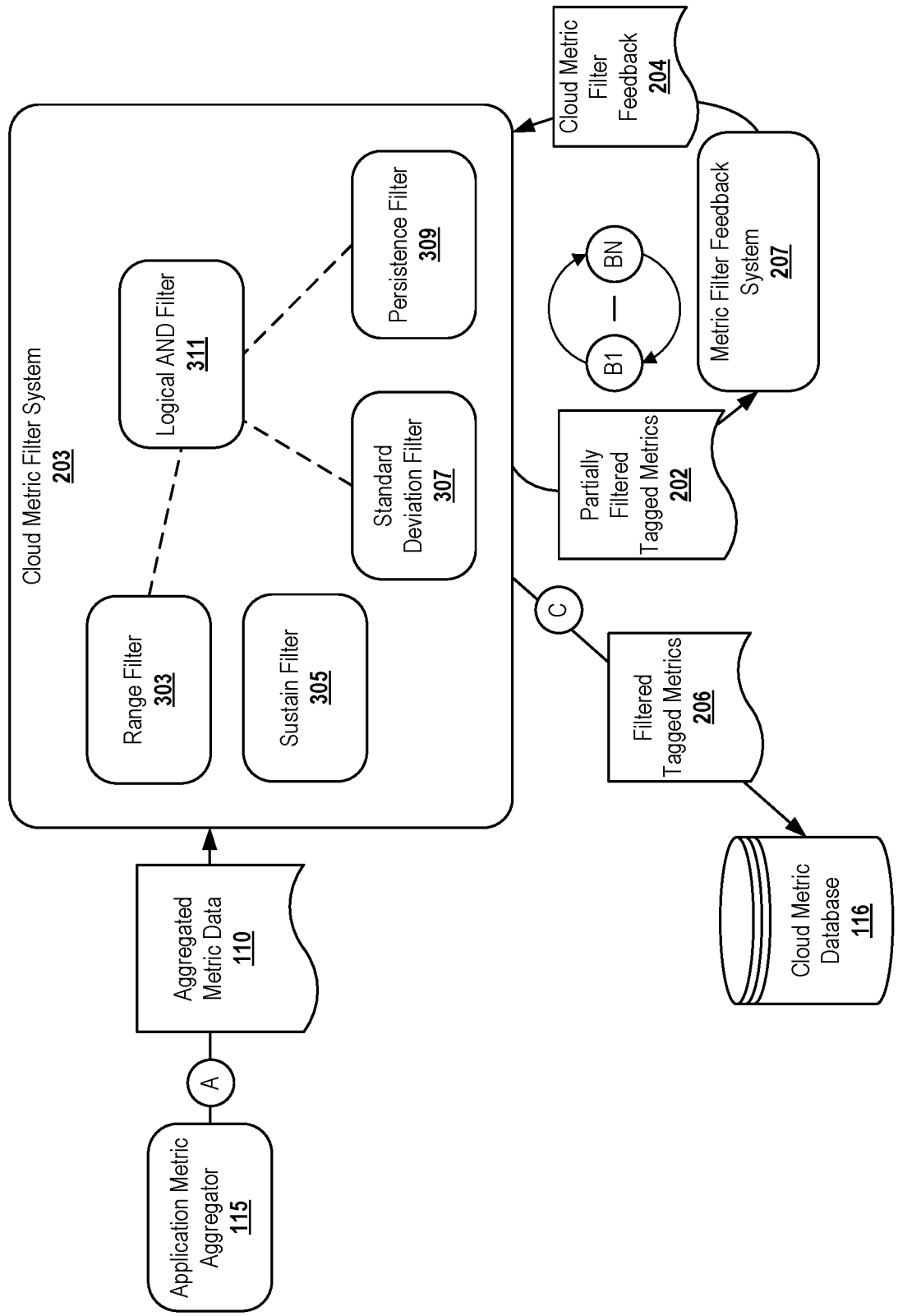
FIG. 3 is a schematic diagram of an example cloud metric filter system with a combination of statistical and logical cloud metric filters.

FIG. 2 is a schematic diagram of a cloud monitoring system for filtering metric values with a cloud metric filter feedback loop. FIGS. 2 and 3 comprise reference numbers to components previously depicted in FIG. 1 including the cloud-based platform 104, the cloud metric data 108, the cloud metric aggregator 151, the aggregated metric data 110, the cloud metric database 116, and the user interface 122.

A cloud monitoring system 200 comprises a cloud metric filter system 203 with one or more cloud metric filters 205 in a feedback loop with a metric filter feedback system 207. The cloud metric filter system 203 receives aggregated metric data 110 from the cloud metric aggregator 151 and filters the aggregated metric data 110 producing partially filtered tagged metrics 202. The metric filter feedback system 207 receives the partially filtered tagged metrics 202 and communicates cloud metric filter feedback 204 in response as part of a feedback loop. The partially filtered tagged metrics 202 comprise metric values output by one of the cloud metric filters 205. The cloud metric filter feedback 204 comprises updates to filters in the cloud metric filters 205 as well as, in some embodiments, a subsequent filter to use on the filtered metric values 202. The cloud metric filters 205 can comprise various combinations of a statistical filter, a sustain filter, a range filter, a logical operator filter, a persistence/coherence filter, etc. In addition, a cloud metric filter can have multiple instances of a filter type. The types and functionality of filters is described in greater detail with respect to FIG. 3. The metric filter feedback system 207 determines the order of filters to use in the cloud metric filters 205 based on the partially filtered tagged metrics 202 and can dynamically update both filter order and parameters of each filter as the partially filtered tagged metrics are received across feedback loop iterations. The feedback loop can occur separately, and in some instances in parallel, for tagged metrics in the aggregated metric data 110 corresponding to different tags.

After the iterations of the feedback loop are complete, the cloud metric filter system 203 communicates filtered metric values 206 to the cloud metric database 116. The filtered tagged metrics 206 are produced by filtering the aggregated metric data 110 for each tag through one or more of the cloud metric filters 205 during the feedback loop. A user queries the cloud metric database 116 through a user interface 122 with cloud metric queries 220 and the cloud metric database 116 returns outlier metric values 218 from the filtered tagged metrics 206. The cloud metric queries 220 can comprise metric types and tags for which to retrieve the outlier metric values 218. Application metric values can have multiple tags and the cloud metric queries 220 can specify multiple tags that the corresponding outlier metric values 218 must contain. For example, the cloud metric queries 220 can specify a customer identifier and an account identifier and the outlier metric values 218 will comprise metric values associated in vectors with tags representing or indicating both the customer identifier and account identifier tags.

FIG. 3 is a schematic diagram of an example cloud metric filter system with a combination of statistical and logical cloud metric filters. FIG. 3 is annotated with a series of letters A, B1-BN, and C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the cloud metric filter system 203 receives aggregated metric data 110 from the cloud metric aggregator 115. The cloud metric filter system 203 comprises a range filter 303, a sustain filter 305, a standard deviation filter 307, a persistence filter 309, and a logical AND filter 311. The sustain filter 305 and the persistence filter 309 are stateful and can have internal parameters dynamically updated in a feedback control loop with the metric filter feedback system 207, whereas the logical AND filter 311, range filter 303, and standard-deviation filter 307 are stateless and depend on the aggregated metric data 110. The logical AND filter 311 is depicted as loosely coupled to the filters 303, 307, and 309. This represents the logical AND filter 311 receiving outputs from the filters 303, 307, and 309 during iterations of the feedback control loop. Conversely, the sustain filter 305 is depicted in isolation from the filters 303, 311, 307, and 309. The sustain filter 305 sustains metric values for metrics by specified tags across iterations of the entirety of stages A, B1-BN, and C (e.g., across previous time windows for aggregated metric values). A tag or tag criterion can be specified for a filter as a parameter for the filter.

The cloud metric filter system 203 can normalize the metric values in the aggregated metric data 110 by calculating a Z-score for the metric values within the aggregated metric data 110 or at least those associated with a tagged metric that satisfies a tag criterion. The cloud metric filter system 203 can then filter out those datums that are not outliers based on the Z-scores. Alternatively, this operation can be performed by the cloud metric aggregator 115. This normalization allows a standardized notion of outliers across cloud metrics. The cloud metric filter system 203 can maintain a mean and standard deviation for each tagged metric across multiple iterations of stages A, B1-BN, and C and can normalize according to the stored mean and standard deviation. The normalization can occur for each cloud metric with the scope of all metric tags.

The range filter 303 specifies at least one of an upper and a lower value. Application metric values are then filtered to be above the lower value and below the upper value, or in instances where only one is present above the lower value or below the upper value. The upper value and lower value can be specified for either normalized or unnormalized metric values. For instance, a metric value such as CPU percent usage can have a hard cutoff (e.g., 90%) above which automatically corresponds to outlier behavior. The range filter 303 can be a lower value of 90% CPU usage that filters all CPU usage values below 90%. The standard deviation filter 307 filters metric values to be above a threshold number of standard deviations and below a threshold number of standard deviations (e.g., 2). The upper threshold and lower threshold number of standard deviations can be different. The standard deviation filter 307 can be implemented using a logical AND filter 311 of two instances of the range filter 303, one with a lower value above the mean and another with an upper value below the mean.

The sustain filter 305 sustains metrics to track when outliers for the metrics are detected. Single time-point outliers of a metric are converted/sustained into multi time-point values of the metric for possible use with other filters in determining significance. Cloud metrics previously having outlier values can be of interest for future outlier behavior and can be sustained using the sustain filter 305. The sustain filter 305 maintains a list of sustained metrics and adds metric values in the aggregated metric data 110 corresponding to metrics in the sustain list to the filtered tagged metrics 206. Subsequently, the cloud metric filter system 203 filters the aggregated metric data 110 (including those already filtered by the sustain filter 305) at stages B1-BN and the sustain filter 305 adds tagged metrics corresponding to metrics present after the final stage BN to the sustain list with a baseline sustain value or, if already present in the sustain list, increments the sustain value to the baseline. The sustain value corresponds to the number of filtering iterations/time windows (i.e., stages A, B1-BN, and C) to sustain each cloud metric. In this embodiment, all cloud metrics filtered as outliers by the feedback control loop at stages B1-BN have their sustain value increase to the baseline (e.g., 5 iterations) so as to track behavior for the corresponding cloud metrics over time. The sustain filter 305 can be configured to only sustain certain cloud metrics and/or metrics that satisfy tag criteria and to vary the baseline sustain value by cloud metric and tag.

Stages B1-BN represent iterations for a feedback control loop between the cloud metric filter system 203 and the metric filter feedback system 207. The letter N represents a number of stages that can vary across time windows of the aggregated metric data 110. The number of stages can further depend on the partially filtered metric values 202 received at each stage and is determined by the feedback control loop. The cloud metric filter feedback 204 comprises updates to the filters 303, 305, 307, and 309. For instance, the updates can be upper and lower values for the range filter 303 and the standard deviation filter 307. After filtering operations at stages B1-BN for a time window, the metric filter feedback system 207 can update the list of sustained cloud metrics and corresponding sustain values for the sustain filter 305. After the feedback control loop at stages B1-BN, the cloud metric filter system 203 communicates the resulting filtered metric values 206 to the cloud metric database at stage C.

Figure 4:
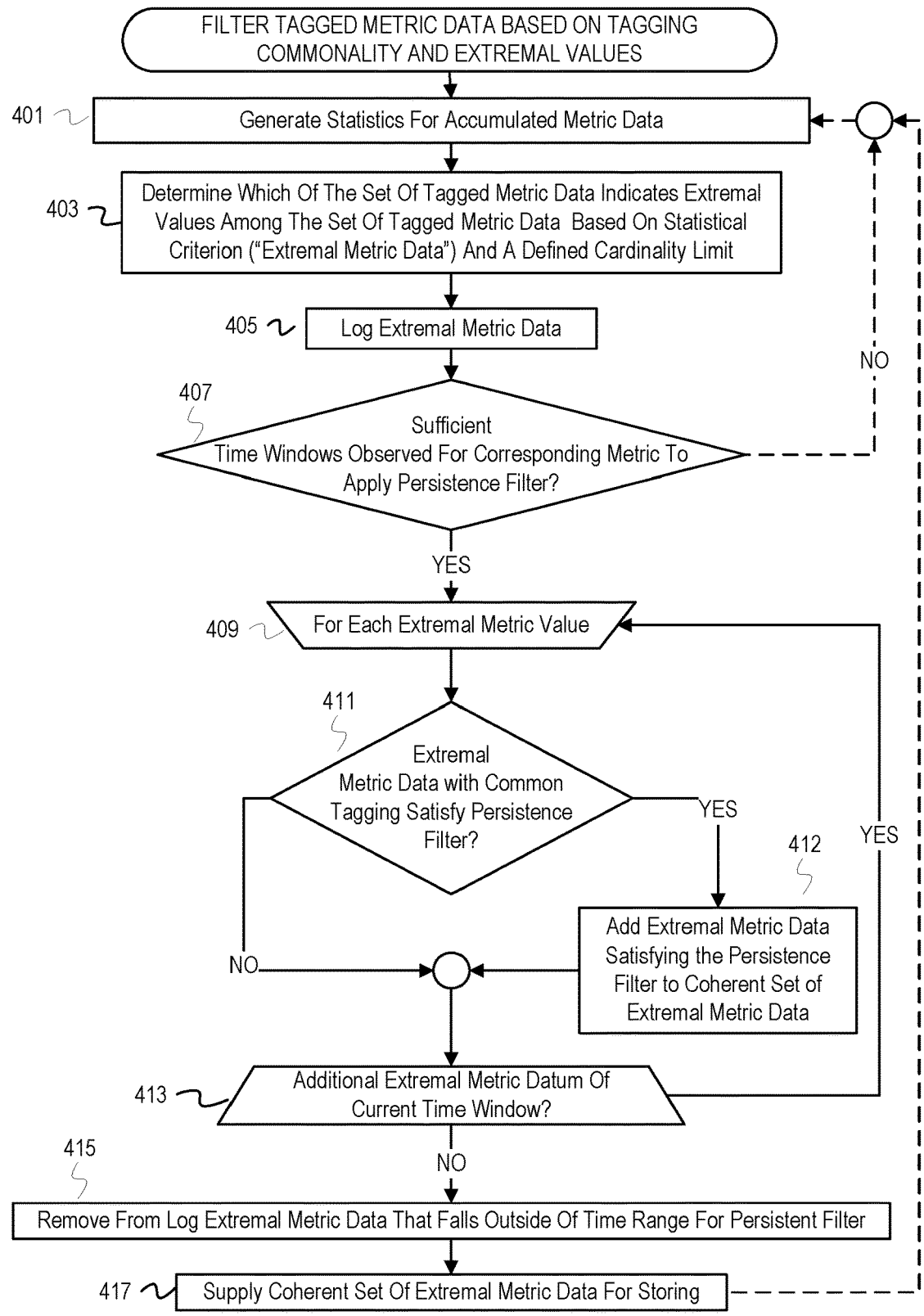
FIG. 4 is a flowchart of example operations for filtering metric values in a cloud monitoring pipeline with a persistence/coherence filter.
Figure 5:
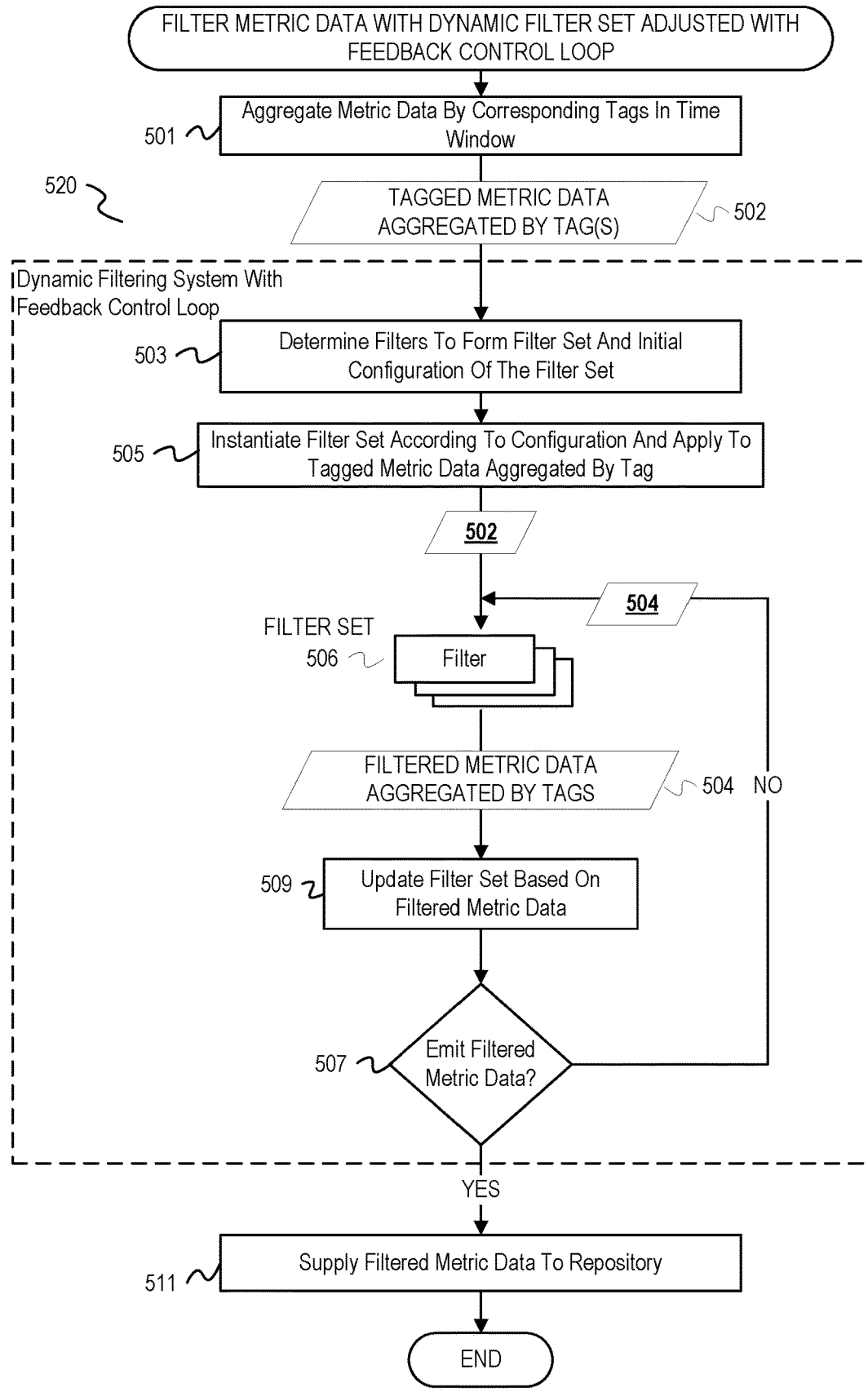
FIG. 5 is a flowchart of example operations for filtering metric data with a dynamic filtering system adjusted with a feedback control loop.
Figure 6:
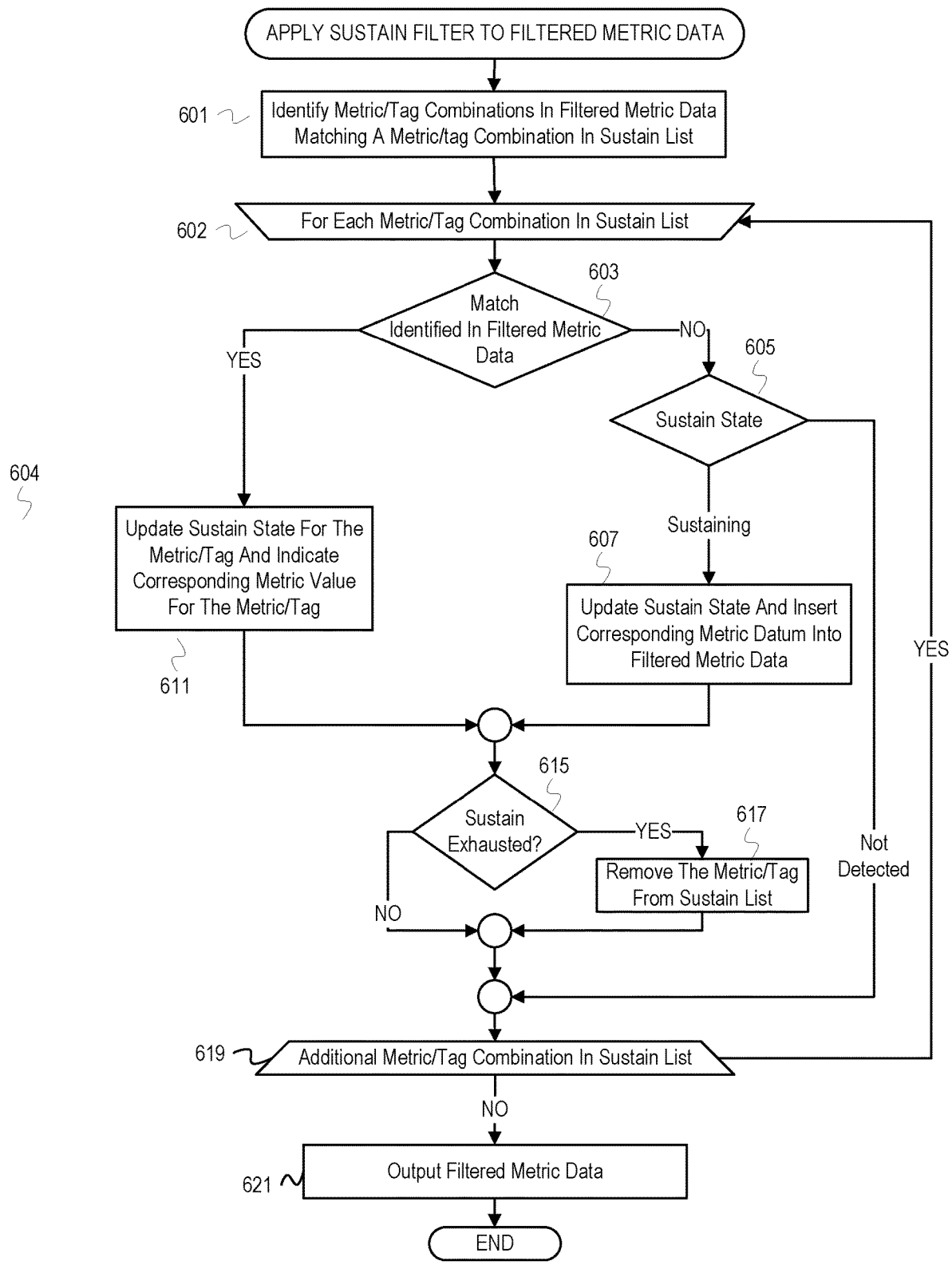
FIG. 6 is a flowchart of example operations for a sustain filter that sustains filtered metric data across iterations.

FIGS. 4-6 are flowcharts of example operations related to the disclosed filtering system. The example operations are described with reference to a cloud monitoring system for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. In addition, slightly different terminology is used as an attempt to address the variability in language to describe technology. For example, "tagged metric data" is used to refer to metric values associated with one or more tags.

FIG. 4 is a flowchart of example operations for filtering metric values in a cloud monitoring pipeline with a persistence filter. The example operations are presented for a single metric, but a system more likely receives metric data for numerous, different metrics. Implementations can run a process for each different metric that would perform the example operations for each metric. Different metrics may be collected at different intervals. In addition, data arrival times for a same metric may dynamically adjust for various reasons (e.g., network health may impact collection or sampling rate). Furthermore, disparate data sources may collect a different number of measurements or values for a metric at different intervals. At the monitoring system, the metric data for a metric is accumulated, in a queue for example, given the potential for varying arrival times. At a defined trigger (e.g., expiration of a time period or full queue), the accumulated metric data is emitted for filtering by the monitoring system. The time window referred to below for the cloud monitoring system refers to a time window corresponding to accumulation of metric data and is also referred to as an accumulation time window. While the term "time window" allows for variability, implementations may conform to a stable time window or consistent time window to obtain stationary aggregated statistics for a metric. Thus, the aggregation or accumulation time window would change infrequently, at least on a per metric basis.

At block 401, a cloud monitoring system generates statistics for metric data within a current accumulation time window. Based on detecting the emit trigger, the cloud monitoring system generates statistical indicators of distribution or dispersion of the accumulated metric data. Examples of the statistical indicators include mean and standard deviation. The cloud monitoring system may include the endpoints that receive metric data directly from data sources or from an intermediary (e.g., a geographic collection point). Embodiments may preprocess the data before filtering, such as normalizing tags. Since the data sources are disparate, the metric data may be tagged differently despite corresponding to a similar concept. For instance, a tag user_id and a tag user may be normalized to be a tag for some scope (an individual user). In addition, the metric data is stored into a structure (e.g., database, file, in-memory structure) that facilitates aggregating of the datum of the metric data by tags.

At block 403, the cloud monitoring system determines which of the set of tagged metric data indicates extremal metric values among the set of metric data based on a statistical criterion and a defined cardinality limit. The tagged metric data of the set determined to indicate extremal metric values among the set are referred to as extremal metric data. The statistical criterion can take many forms. As examples, the statistical criterion may be the top-N metric values within the set, the bottom-N metric values within the set, at most N metric values above and/or below thresholds, etc. The statistical criterion is bound by the cardinality limit N and together can be considered applying an extremal value filter. The cardinality parameter constraining the extremal metric data can vary depending upon the metric. For instance, cloud metrics expected to have many outliers may be associated with a larger cardinality limit. Implementations can choose different cardinality limits for different extremal value groups, such as lower extremal and upper extremal metric values. Setting the cardinality limit allows a monitoring and observability system to focus or analyze metrics corresponding to a finite number of problem sources within an immense space of measurable metrics.

At block 405, the cloud monitoring system logs the extremal metric data. The cloud monitoring system logs or records the determined extremal metric data for a current time window for application of a persistence filter. Applying the persistence filter involves looking across a series of accumulation time windows, thus the determined extremal metric data is tracked across time with logging/recording into a structure or file. Applying the extremal metric filter will substantially reduce the amount of metric data to store. Thus, the resources for tracking the determined extremal metric data are nominal, at least when compared to the initially received metric data for a time window.

At block 407, the cloud monitoring system determines whether sufficient time windows of metric data for the metric have been observed based on the persistence filter for the metric. A persistence filter will define a ratio of time windows (e.g., four of five), not necessarily with a sequential requirement, for observing extremal metric data. Assuming the persistence filter specifies s of w time windows or s/w, then the persistence filter cannot be applied without observing at least w time windows. The ratio of the persistence filter can be tuned or configured to achieve a desired trade-off between false positives and outlier-detection latency. A small s (e.g., s<=3) will produce a greater number of false positives while a large w (e.g., w>=2*s) will incur more detection latency. Additionally, increasing w while simultaneously reducing the aggregation period can help to reduce false-positives without unduly increasing latency. If a sufficient number of time windows have not been observed, then operational flow returns to 401, with the dashed lines representing asynchronous operation. If sufficient time windows of metric data for the metric have been observed, then operational flow continues to block 409.

At block 409, the cloud monitoring system begins iteratively processing the extremal metric data logged from the current time window to filter out those of the currently logged and previously logged metric data that do not satisfy the persistence filter. A persistence criterion can be defined for each metric or for multiple metrics (e.g., by metric type).

At block 411, the cloud monitoring system determines whether logged extremal metric data across time windows having tagging commonality with the current extremal metric data satisfy the persistence filter. As an example, a first persistence filter can be defined for metric A with the condition that extremal metric data having common tagging occur in 3/5 time windows. The strictness of commonality is configurable. A persistence filter can be defined to require exact tag matching across extremal metric data, common scoping tags (e.g., tags corresponding to individual or enterprise scope for the metric data), overlap of 2 of 3 tags to satisfy tagging commonality, etc. Filtering based on persistence facilitates the removal of metric values for the metric that are likely noise (i.e., likely not corresponding to abnormal behavior). To illustrate, one example metric is number of executing processes and data for this metric is collected across devices/endpoints that connect to an enterprise network. Normal behavior for this metric may encompass high variation on an endpoint at any given time window. With knowledge about the behavior of this metric, the parameters for a persistence filter can be set to be large. The magnitude of the minimum observation parameters for a persistence filter may be vary across metrics depending on metric priority for a system.

At block 412, the cloud monitoring system adds the extremal metric data that satisfy the persistence filter to a coherent set of extremal metric data. To illustrate, assume an extremal metric datum of the current time window for a metric A is a {23, enterprise, computer}. Also assume extremal metric data of prior time windows are {44, enterprise, computer} and {38, enterprise, table}. These extremal metric data would be added to the coherent set assuming a persistence filter that specifies 3/5 time windows and commonality of the tag enterprise.

At block 413, the cloud monitoring system determines whether there is an additional extremal metric datum of the current time window. If an additional extremal metric datum is indicated, operational flow returns to block 409 for processing of the next extremal metric datum of the current time window. Otherwise, operational flow proceeds to block 415.

At block 415, the cloud monitoring system removes from the log the extremal metric data that falls outside of the time range of the persistent filter. For a persistent filter that specifies a filtering condition of s/w, the cloud monitoring system will maintain a log or queue length of time windows of at least w. Implementations can maintain more than w time windows of metric data per metric depending on memory sources.

At block 417, the cloud monitoring system supplies the coherent set of extremal metric data for storing. The cloud monitoring system supplies the coherent set of extremal metric data for storing in a repository of metric data accessible for analysis, security monitoring, etc. Asynchronously, operational flow continues to block 401 to obtain a next set of tagged metric data.

FIG. 5 is a flowchart of example operations for filtering metric data with a dynamic filtering system adjusted with a feedback control loop. In addition to a persistence filter, multiple other types of filters can be applied with dynamic logical combining and/or dynamic adjustment of filter configuration. The combination of filters is referred to as a filter set and the container of the filter set is referred to as the dynamic filtering system or cloud metric filter system. The dynamic filtering system is program code and/or process(es) instantiated from the program code that instantiates a filter set according to a configuration and manages flow of data among the constituent filters according to the filter set configuration. A filter can be programmed/designed to self-adjust based on an internally maintained state, thus being a self-contained filter. A self-contained filter can be independently deployable into a filter set, potentially without interruption of a filter set that is already active in monitoring data. The dynamic filtering system includes a feedback control loop that adjusts the filter set and/or configuration of the filter set based on feedback parameters and observations of the tagged metric data.

At block 501, a cloud monitoring system aggregates metric data for a metric. This presumes that the cloud monitoring system observes in a same space (e.g., same data stream or same data repository(ies)) metric data of different metrics. Tags may be used to distinguish metric data for different metrics in addition to scope. In that case, the cloud monitoring system would aggregate metric data having a common tag indicating a metric (e.g., tagging metric data for database accesses per time interval t with tag db_accesses).

The aggregated metric data 502 is then fed into a dynamic filtering system with a feedback control loop 520 that manages the filter set and filter set configuration. In this example, the operations represented by blocks 503, 505, 507, and 509 correspond to the dynamic filtering system 520. The dynamic filtering system 520 can have a dynamic number of iterations according to the outputs of the filter set and feedback on these outputs from the feedback control loop. The dynamic filtering system 520 dynamically controls the order and internal parameters of the filter set based on metric values filtered at each iteration. Determination of whether input (i.e., aggregated tagged metric data 502) includes outliers that are not filtered out by the dynamic filter aggregate drives the feedback.

At block 503, the cloud monitoring system determines the filters that will form a filter set 506 and initial configuration of the filter set. A default or initial set of filters may be loaded and configured as the filter set when the dynamic filtering system launches. This can be determined from an initial configuration file that specifies the constituent filters, sequencing, and any logical combinations. The dynamic filtering system 520 can modify the configuration file or the filter arrangement directly. An example filter set can be arranged as follows: a sustain filter, a range filter, and a persistence filter. A filter set can also include one or more logical filters that apply a logical operand(s) to outputs of other filters in the filter set. For instance, a logical AND filter can take as input the output of a range filter and a persistence filter. The logical AND filter will output all metric values output by both the range filter and the persistence filter. Other logical operators such as OR and NOT can be used, and logical operators can be composed across outputs of multiple filters. A constituent filter may be stateless or stateful. For instance, a sustain filter is a stateful filter. When a filter set includes a sustain filter, the sustain filter maintains a list of previously observed tagged metric data along with sustain values computed by the sustain filter. The dynamic filtering system 520 adds metric values corresponding to a metric on the list with a positive sustain value to the filtered metric values 504. A more detailed description of a sustain filter is given with reference to FIG. 6.

At block 505, the dynamic filtering system 520 instantiates the filter set 506 according to the determined configuration and applies the instantiated filter set 506 to the tagged metric data 502 aggregated by tag(s). Applying the filter set 506 produces residual or filtered metric data 504 aggregated by tags. If there are subsequent iterations of filter set adjustments based on the feedback control loop, the set of tagged metrics aggregated by tag will be updated, with metrics that do not satisfy the filters being removed from the set at the end of the filtering cycle.

At block 507, the dynamic filtering system 520 updates the filter set 506. Updating the filter set 506 can be based on the filtered metric data 504. An example of updating the filter set 506 includes a constituent filter updating its internal state. In addition, the dynamic filtering system 520 can revise constituency of the filter set 506 based on the outputs of the constituent filters (i.e., based on residual metric data after the filter set 506 has been applied).

At block 509, the dynamic filtering system 520 determines whether the metric data filtered by the current filter set is to be emitted. Determination of whether to emit the filtered metric data 504 is based on whether the filtered metric data 504 includes an outlier(s). If the filtered metric data 504 includes outliers, then the corresponding metric is possibly exhibiting abnormal behavior and the filtered metric data may be stored for analyzing, presenting, and/or monitoring. This determination of whether the filtered metric data 504 includes an outlier metric value can be based on statistical analysis, defined thresholds or criteria, and/or indirect relation to running conditions of the dynamic filtering system. As examples of statistical analysis done to determine whether filtered metric data includes an outlier, the dynamic filtering system can perform statistical tests for each filtered metric value and can compare metric values to statistics of prior metric values for a corresponding metric/tag combination. As an example of defined criteria, a user can specify a threshold as an outlier threshold for certain metrics. The dynamic filtering system 520 then treats a value of that metric that satisfies the hard threshold as an outlier. As examples of a running condition that indirectly relates to determination of a metric value as an outlier, a condition can be specified that applying n filters across feedback iterations satisfies the condition to treat the filtered metric data as having an outlier or a condition can be specified that filtered metric data be deemed as having an outlier if every type of filter has been applied across feedback loop iterations. If the dynamic filtering system 520 determines that the filtered metric data at the current iteration of the feedback control loop includes an outlier, operational flow proceeds to block 511 for output from the dynamic filtering system 520 of the filtered metric data 504 deemed to include an outlier. If the dynamic filtering system 520 determines that the filtered metric data is not yet to be emitted, then the filtered metric data 504 is input into the (possibly updated) filter set 506.

At block 511, the cloud monitoring system stores the filtered metric data to a repository. The metric filtering system can store the filtered metric data into a repository via a function(s) defined by an application programming interface (API) for the repository. The repository hosts filtered metric data from the cloud monitoring system and possible other cloud monitoring systems. Queries can be performed on this repository for monitoring, analysis, etc. Implementations may communicatively couple multiple cloud monitoring systems and/or dynamic filtering systems in a sequence of hierarchy to incrementally reduce the size of the filtered metric data eventually being stored in a repository.

FIG. 6 is a flowchart of example operations for a sustain filter that sustains filtered metric data across iterations. As noted above, the sustain filter can be a constituent filter of a filter set in a dynamic filtering system. A sustain filter can be implemented in coordination with a persistence filter in addition or regardless of being a member of a filter set in the dynamic filtering system. Thus, the sustain filter can sustain a metric datum across iterations which can be accumulation time windows and/or cycles of the feedback control loop. Sustaining a metric datum across i iterations after being detected in an initial iteration and regardless of whether it occurs in subsequent iterations creates a time-series data set for the metric datum instead of single point or scattering of disconnected points, which aid in presentation of a more visually coherent data set.

At block 601, a sustain filter identifies any metric and tag combinations (metric/tag) in filtered metric data matching a metric/tag combination in a sustain list. The filtered metric data may be output from a persistence filter or filtered metric data of a feedback cycle of the dynamic filtering system. To illustrate, the sustain filter may receive an array with the filtered metric datum. The sustain filter computes hash values of each metric/tag combination in the array and searches the sustain list for matching hash values. If the sustain state has been exhausted for a metric/tag, the metric/tag can be removed from the sustain list.

At block 602, the sustain filter traverses the sustain list. The sustain list can be implemented differently depending upon platform, resources, preferences, etc. As an example, the sustain list can be a data structure with an entry for each hash value of a metric/tag combination to be sustained. Each entry also indicates a number of iterations to sustain matching datum of filtered metric data. Each entry can host a sustain state or reference a sustain state for the corresponding metric/tag. A sustain state can be implemented as an integer with 0 indicating that the metric/tag sustain has been exhausted/completed within a current filtering context (i.e., filtering across feedback cycles context or filtering across aggregation windows context). Assuming i represents sustain iterations, an implementation can use i+1 to indicate that a metric/tag is yet to be detected in the filtering context.

At block 603, the sustain filter determines whether a match for the sustain list metric/tag was identified in the filtered metric data. If so, then operational flow continues to block 609. If not, then operational flow continues to block 605.

At block 605, the sustain filter determines the current sustain state for the sustain list metric/tag. Being in the sustain state means the metric/tag has been detected in a prior iteration of the filtering context and is currently being sustained. "Not Detected" means the metric/tag has yet to be detected in this filtering context by the sustain filter. If the metric/tag has not yet been detected, then operation flow continues to block 619 for evaluation of the next metric/tag in the sustain list. Otherwise, operational flow continues to block 607.

At block 607, the sustain filter updates sustain state and inserts the corresponding metric datum into the filtered metric data. For instance, the sustain filter decrements the sustain state value which also operates as a counter of sustained iterations. The sustain filter also retrieves metric datum that corresponds to the metric/tag and that at least includes a metric indication (e.g., 'CPU performance'), tag(s), and metric value. Implementations that use the metric/tag values in the sustain list instead of compact representations (e.g., hash values) for matching may choose to create the metric datum to be inserted into the filtered metric data with the metric/tag values stored in the sustain list for matching and a corresponding metric value associated with the entry.

At block 615, the sustain filter determines whether the sustain state indicates that the sustaining has been exhausted. Assuming a sustain state of '0' indicated exhaustion, decrementing the sustain state in block 607 may correspond to the last iteration for sustaining. If the sustain state indicates exhaustion, the operational flow continues to block 617. Otherwise, operational flow continues to block 619.

At block 617, the sustain filter removes the metric/tag from the sustain list. The metric/tag is removed from the sustain list since the metric/tag has exhausted the sustaining iterations for the filtering context. Embodiments can mark entries in the sustain list as exhausted (e.g., with a flag) instead of removing them. Operational flow proceeds from block 617 to block 619.

At block 619, the sustain filter determines whether there is an additional metric/tag combination in the sustain list to process. If so, flow returns to block 602. Otherwise, operational flow proceeds to block 621 where the filtered metric data is output, perhaps to another filter or for supplying for storage.

If the sustain filter determined that a match in the filtered metric data had been identified for the sustain list metric/tag (603), then the sustain filter updates sustain state for the metric/tag and indicates the corresponding metric value for the metric/tag from the matching filtered metric datum. If the sustain state indicates that the metric/tag has not yet been detected, then this is the first detection of the metric/tag in filtered metric data. Thus, updating the sustain state updates the sustain state to indicate that the metric/tag is now being sustained. Assuming the implementation with i representing sustain iterations and i+1 representing the "Not Detected" sustain state, decrementing the sustain state value yields the remaining number of iterations to sustain the metric/tag. In addition, indicating the metric value involves the sustain filter recording the metric value of the matching filtered metric datum into the sustain filter or a structure referenced/associated with the sustain list. If the metric/tag was already in the sustaining state, then the sustain filter overwrites the metric value with the metric value of the currently matched filtered, metric datum. Operational flow proceeds to block 615.

Flowcharts 4-6 refer to metrics associated with tags for example filtering operations. Persistence and sustain filters are applied at the scope of a combination of a metric and metric tags. Embodiments can strip tags from tagged metrics to further reduce the amount of data being analyzed and apply a filter or filter set based on a remaining or subset of tags. For example, a tag that distinguishes between different zones in a given data-center (e.g. ZONE=us-east-1d) for the metric CPU utilization may not be helpful for some kinds of analysis and would be stripped. However, a tag(s) that differentiates among code instances in different pods for CPU utilization can be informative, for example when analyzing workload distribution.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Figure 7:
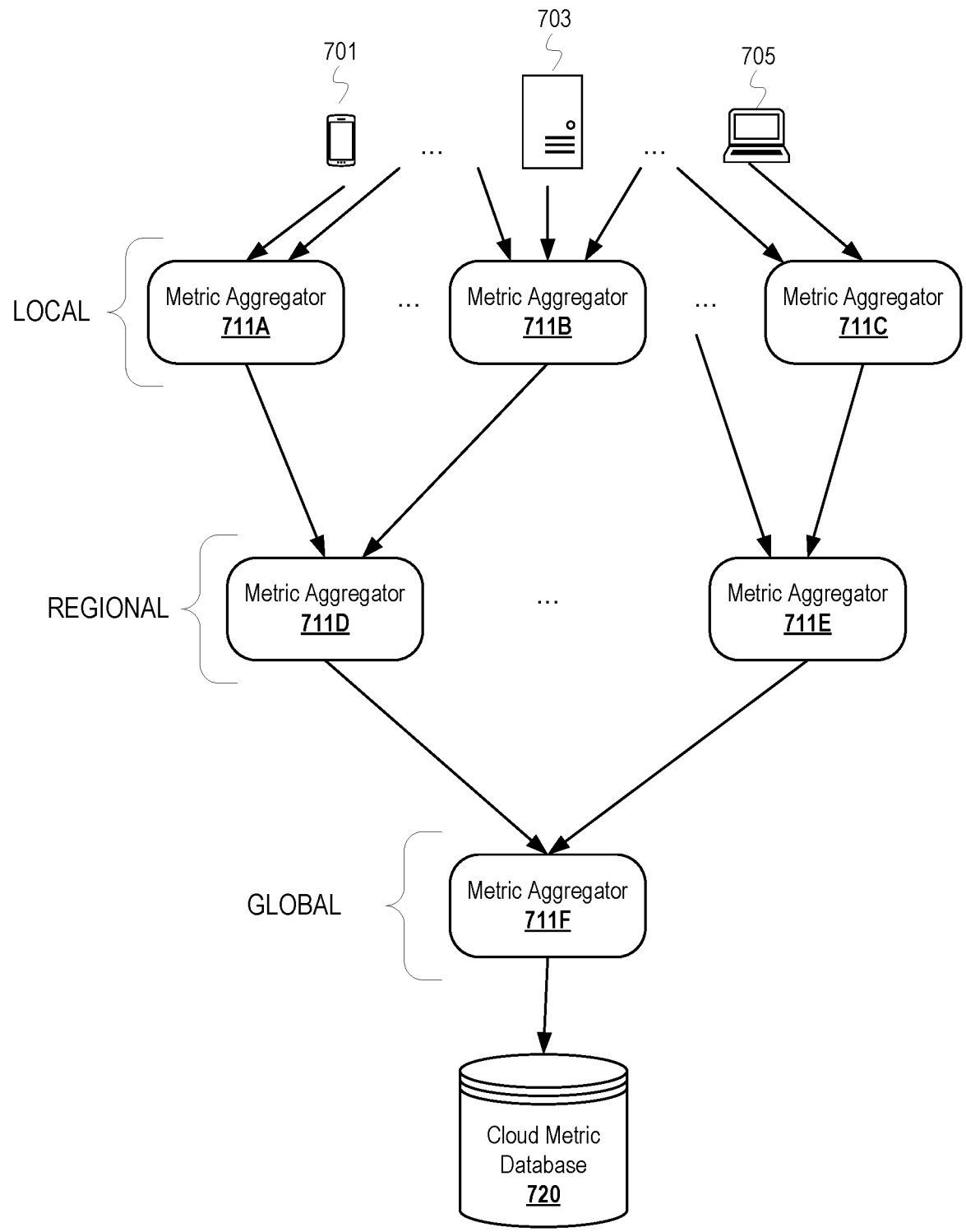
FIG. 7 depicts a diagram of a hierarchical arrangement of metric aggregators for a cloud metric monitoring system.

FIG. 7 depicts a diagram of a hierarchical arrangement of metric aggregators for a cloud metric monitoring system. Endpoints including representative devices 701, 703, 705 generate tagged metrics and push the tagged metrics to local metric aggregators including representative metric aggregators 711A-711C. After the local metric aggregators aggregate metric data and filter the aggregated metric data, each of the local metric aggregators communicate its filtered metric data to a respective one of regional metric aggregators represented by regional metric aggregators 711D-711E. The regional metric aggregators aggregate the filtered metric data from corresponding ones of the local metric aggregators and filter them. A global metric aggregator 711F receives filtered metric data from the regional metric aggregators, and then aggregates and filters the incoming filtered metric data. Each level of the hierarchical arrangement aggregates metric data pushed at successively lower/greater time resolutions. As an example, the local metric aggregators receive metric data generated at a 1 second resolution and aggregates the metric data to generate the metric data at a 30 second resolution. After filtering the 30 second resolution metric data, a regional metric aggregator aggregates filtered 30 second resolution metric data received from a configured number of the local metric aggregators into 1 minute resolution metric data. After filtering the 1 minute resolution metric data, the regional metric aggregators push the filtered 1 minute resolution metric data to the global metric aggregator 711F. The global metric aggregator 711F aggregates the 1 minute resolution metric data into 5 minute resolution metric data. After filtering, the global metric aggregator 711F emits the filtered 5 minute resolution metric data to a repository 720 accessible for analysis, presentation, etc. Metric aggregators of each level of the hierarchy can implement filtering with a persistence/coherent filter, a dynamic feedback filtering system, or persistence/coherence filter and a dynamic feedback filtering system. The hierarchical arrangement distributes the workload allowing scalability with visibility of metric at the different aggregation levels with significant reduction in metric data volume at the larger geographic levels. In addition to the aggregating and filtering, metric aggregators can add and/or remove tags.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), cloud ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
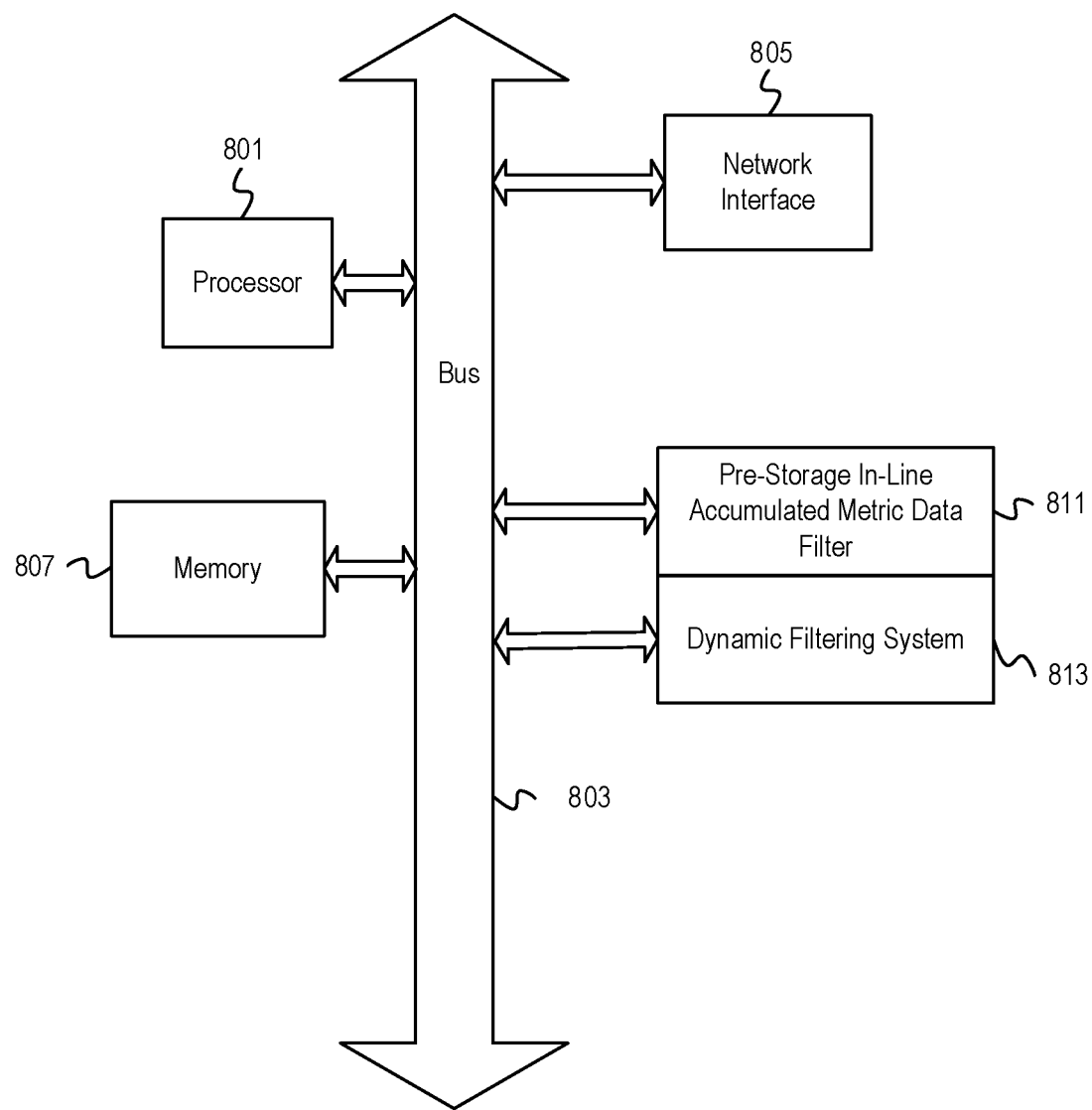
FIG. 8 depicts an example computer system with a dynamic filtering system and a pre-storage in-line accumulated metric data filter.

FIG. 8 depicts an example computer system with a dynamic filtering system and a pre-storage in-line accumulated metric data filter. The computer system includes a processor 801 (possibly including multiple processors, multiple cores, multiple nodes, and/or implementing multithreading, etc.). The computer system includes memory 807. The memory 807 may be system memory or any one or more of the above already described possible realizations of machine-readable media. The computer system also includes a bus 803 and a network interface 805. The system also includes a pre-storage in-line accumulated metric data filter 813. The pre-storage in-line accumulated metric data filter 811 filters tagged, metric data accumulated from disparate data sources distributed across one or more networks. The pre-storage in-line accumulated metric data filter 811 filters tagged, metric data as described earlier prior to storage for security monitoring, security analysis, display, etc., to prevent metric data that does not information abnormal behavior from placing unnecessary load on computing resources and provide coherent information. The pre-storage in-line accumulated metric data filter 811 can utilize a persistence filter and filter set as described above. The system also includes a dynamic filtering system 813. The dynamic filtering system 813 also filters metric data prior to storage. However, the dynamic filtering system 813 employs a feedback control loop to adjust a filter set applied to accumulated metric data to account for long ranging behavior and/or erratic behavior. The pre-storage in-line accumulated metric data filter 811 can operated in coordination with the dynamic filtering system 813. Any one of the previously described functionalities may be partially (or entirely) implemented in hardware and/or on the processor 801. For example, the functionality may be implemented with a cloud specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for filtering metric values as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
   obtaining first tagged metric data from disparate data sources, wherein a tagged metric datum comprises a metric indicator, a set of one or more tags, and a metric value;
   determining a first set of extremal metric data in the first tagged metric data, wherein the first set of extremal metric data is constrained to a defined cardinality and has a first tag in common and wherein each datum of the first set of extremal metric data indicates an extremal metric value among metric values indicated by the first tagged metric data;
   filtering a superset of extremal metric data which yields a filtered set of extremal metric data that has tagging commonality and that occurs in a specified ratio of accumulation time windows,
      wherein the superset of extremal metric data includes the first set of extremal metric data and at least a second set of extremal metric data,
      wherein each set of the superset of extremal metric data is constrained to the defined cardinality and corresponds to a different time window; and
   supplying the filtered set of extremal metric data for storing in a repository of metric data.

2. The method of claim 1 further comprising:
   obtaining second tagged metric data from second disparate data sources, wherein the second tagged metric data is at a first time granularity;
   aggregating the second tagged metric data into aggregated tagged metric data at a second time granularity;
   filtering the aggregated tagged metric data which produces filtered tagged metric data; and
   emitting the filtered tagged metric data to a system that is distinct from a system that obtains the second tagged metric data, wherein the first tagged metric data comprises the filtered tagged metric data.

3. The method of claim 2 further comprising determining which metric values of the first tagged metric data indicate extremal metric values based, at least in part, on statistical information about the first tagged metric data.

4. The method of claim 2, wherein determining statistical information about the first tagged metric data comprises determining at least one of average and mean deviation of metric values indicated in the first tagged metric data.

5. The method of claim 1 further comprising grouping the first tagged metric data by commonality of a tag or of a combination of tags, wherein determining the first set of extremal metric data comprises determining the first set of extremal metric data in a first grouping of the first tagged metric data.

6. The method of claim 1, wherein the second set of extremal metric data comprises second tagged metric data that was accumulated in a second accumulation time window that preceded a first accumulation time window in which the first tagged metric data was accumulated.

7. The method of claim 1, wherein obtaining the first tagged metric data comprises accumulating tagged metric data received within an accumulation time window from the disparate sources and aggregating the tagged metric data that has been accumulated into a coarser time granularity.

8. The method of claim 1, wherein the cardinality is defined for a combination of a metric indicator and at least one tag.

9. The method of claim 1 further comprising additional filtering of the filtered set of extremal metric data prior to supplying, wherein the additional filtering is with a filter set that comprises multiple filters.

10. The method of claim 9, wherein the additional filtering comprises iteratively applying the filter set to the filtered set of extremal metric data until the resulting filtered set of extremal metric data includes one or more outlier metric values and adjusting configuration of the filter set in each iteration based, at least in part, on the resulting filtered set of extremal metric data after each application of the filter set, wherein adjusting configuration of the filter set comprises adjusting at least one of a parameter of a constituent filter, membership of the filter set, and arrangement of the constituent filters forming the filter set.

11. The method of claim 10, wherein the filter set comprises two or more filters that filter based on standard deviation, range thresholds, and logical combinations of other filters in the filter set.

12. The method of claim 9 further comprising sustaining a metric datum of a specified metric and tag combination for a number of iterations specified for the metric and tag combination, wherein sustaining the metric datum comprises initially detecting the metric datum for the metric and tag combination in the filtered set of extremal metric data and subsequently inserting the metric datum into a later set of filtered extremal metric data when not detected until the insertion has been performed for the specified number of sustain iterations.

13. A non-transitory, computer-readable medium having program code stored thereon, the program code comprising instructions to:
   accumulate tagged metric data in a queue, wherein each datum of the tagged metric data includes a metric indicator, a set of one or more tags, and a metric value;
   filter the accumulated tagged metric data, wherein the instructions to filter the accumulated tagged metric data comprise instructions to,
      select, limited to a cardinality defined for a metric corresponding to the tagged metric data, a first subset of the accumulated tagged metric data grouped by tag commonality that includes first extremal metric values with respect to the grouped metric data; and
   emit the filtered metric data for storing.

14. The non-transitory, computer-readable medium of claim 13, wherein the instructions further comprise instructions to select, limited to the cardinality, a second subset of the accumulated tagged metric data grouped by the tag commonality that includes second extremal metric values with respect to the grouped metric data, wherein the first extremal metric values and the second extremal metric values are the greater and lesser metric values, respectively.

15. The non-transitory, computer-readable medium of claim 13, wherein the program code further comprises instructions to determine statistical information about the accumulated tagged metric data, wherein the instructions to select the first subset of accumulated tagged metric data comprise instructions to determine the first extremal metric values based, at least in part, on the statistical information.

16. The non-transitory, computer-readable medium of claim 13, wherein the program code further comprises instructions to further filter the filtered first subset of metric data, wherein the further filtering is with a filter set that comprises multiple filters.

17. The non-transitory, computer-readable medium of claim 16, wherein the instructions to further filter comprise instructions to iteratively apply the filter set to the filtered results of the first subset of tagged metric data until the resulting filtered metric data includes one or more outlier metric values and instructions to adjust configuration of the filter set in each iteration based, at least in part, on the resulting filtered metric data after each application of the filter set, wherein the instructions to adjust configuration of the filter set comprise instructions to adjust at least one of a parameter of a constituent filter, membership of the filter set, and arrangement of the constituent filters forming the filter set.

18. The non-transitory, computer-readable medium of claim 16, wherein the program code further comprise instructions to sustain a metric datum of a specified metric and tag combination for a number of iterations specified for the metric and tag combination, wherein the instructions to sustain the metric datum comprise instructions to initially detect the metric datum for the metric and tag combination in the filtered set of metric data and to subsequently insert the metric datum into a later set of filtered metric data when not detected until the insertion has been performed for the specified number of sustain iterations.

19. An apparatus comprising:
a processor; and
a computer-readable medium having instructions stored thereon that are executable by the processor to cause the apparatus to,
accumulate tagged metric data in a queue, wherein each datum of the tagged metric data includes a metric indicator, a set of one or more tags, and a metric value;
filter the accumulated tagged metric data, wherein the instructions to filter the accumulated tagged metric data comprise instructions to,
select, limited to a cardinality defined for a metric corresponding to the metric data, a first subset of the accumulated tagged metric data grouped by tag commonality that includes first extremal metric values with respect to the grouped metric data; and
emit the filtered metric data for storing.

20. The apparatus of claim 19, wherein the instructions to filter the accumulated tagged metric data comprise instructions executable by the processor to cause the apparatus to determine whether any of the first subset of accumulated tagged metric data corresponds to a metric and tag combination previously observed in filtered metric data in a specific ratio of time windows.

* * * * *